US008224832B2

(12) United States Patent
Kemp et al.

(10) Patent No.: US 8,224,832 B2
(45) Date of Patent: Jul. 17, 2012

(54) COMPUTERIZED DOCUMENT EXAMINATION FOR CHANGES (76) Inventors: Richard Douglas Kemp, Atlantic City, NJ (US); Jeffrey Dvornek, Norwalk, CT (US); Mikhail Freider, Bridgewater, NJ (US)

(*) Notice: Subject to any disclaimer, the term of this patent is extended or adjusted under 35 U.S.C. 154(b) by 267 days.

(21) Appl. No.: 12/040,354

(22) Filed: Feb. 29, 2008

(65) Prior Publication Data
US 2009/0222490 A1 Sep. 3, 2009

(51) Int. Cl.
*G06F 17/30* (2006.01)
(52) U.S. Cl. .......................... 707/758; 707/689
(58) Field of Classification Search .................. None
See application file for complete search history.

(56) References Cited

U.S. PATENT DOCUMENTS

| | | | | |
|---|---|---|---|---|
| 5,444,615 | A * | 8/1995 | Bennett et al. | 704/251 |
| 6,219,818 | B1 | 4/2001 | Freivald et al. | |
| 6,990,490 | B2 * | 1/2006 | Sasaki et al. | 1/1 |
| 7,174,377 | B2 * | 2/2007 | Bernard et al. | 709/224 |
| 7,197,716 | B2 * | 3/2007 | Newell et al. | 715/760 |
| 7,664,655 | B2 * | 2/2010 | Rosenthal et al. | 705/1.1 |
| 7,694,217 | B2 * | 4/2010 | Croft et al. | 715/229 |
| 7,698,421 | B2 * | 4/2010 | Bernard et al. | 709/224 |
| 7,983,990 | B2 * | 7/2011 | Bennett et al. | 705/59 |
| 2003/0009345 | A1 * | 1/2003 | Thorpe | 705/1 |
| 2004/0088332 | A1 | 5/2004 | Lee et al. | |
| 2004/0267593 | A1 * | 12/2004 | Sammons et al. | 705/9 |
| 2006/0015885 | A1 * | 1/2006 | Lee et al. | 720/600 |
| 2006/0129593 | A1 * | 6/2006 | Slovak et al. | 707/102 |
| 2006/0190490 | A1 * | 8/2006 | Ritchey et al. | 707/104.1 |
| 2006/0195430 | A1 * | 8/2006 | Arumainayagam et al. | 707/3 |
| 2006/0206490 | A1 * | 9/2006 | Schiller | 707/10 |
| 2006/0242570 | A1 * | 10/2006 | Croft et al. | 715/517 |
| 2007/0100817 | A1 * | 5/2007 | Acharya et al. | 707/5 |
| 2007/0233688 | A1 * | 10/2007 | Smolen et al. | 707/9 |
| 2008/0250052 | A1 * | 10/2008 | Jones et al. | 707/102 |
| 2009/0132911 | A1 * | 5/2009 | Detlef et al. | 715/234 |
| 2010/0106738 | A1 * | 4/2010 | Anderson | 707/769 |

OTHER PUBLICATIONS

Jacob J et al: "CX-DIFF: a change detection algorithm for XML content and change visualization for WebVigiL" Data and Knowledge Engineering, North Holland, vol. 52, No. 2, Feb. 1, 2005, pp. 209-230.
Al Harrison: "KeyCite Review" Internet Citation, [Online], Jan. 19, 2000.
International Search Report, 4 pgs., Apr. 29, 2009.
Chawathe et al., "Change Detection in Heirarchically Structured Information", Dept. of Comp. Sci., Stanford Univ., pp. 493-504, Jun. 1996.

* cited by examiner

*Primary Examiner* — Debbie Le
(74) *Attorney, Agent, or Firm* — Frank J. DeRosa; Jon Gordon; Frommer Lawrence & Haug LLP (57) ABSTRACT

A system and method are provided to examine a changeable monitored document and to provide alerts relating to changes of interest. The logical entities of a monitored document are compared, when changed, to the logical entities of an updatable reference of the monitored document which comprises material from the monitored document at a given time. The system distinguishes between logical entities which have moved within a document and logical entities which have been changed in a document. A user or users are alerted to any change in the monitored document according to the user's preferences. The system also allows the user to specify one or more search terms, thereby allowing a user to receive alerts only when a specified search term or terms appear in a newly changed portion of the monitored document. After examination, an extracted copy of the monitored document is retained as the editable reference.

31 Claims, 8 Drawing Sheets

Fig. 1
Computer Network

Fig. 2
Computer System

Fig. 3
Define Document Examination
Parameters

Fig. 4
Extract, Convert, and Archive Data

Fig. 5
Document Examination
(Without Search Term)

Fig. 6
Document Examination
(With Search Term)

Fig. 7
User Interface

Fig. 8
User Interface

COMPUTERIZED DOCUMENT EXAMINATION FOR CHANGES

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

Data or a document may be changed over time, or from one version to another, etc. The invention disclosed herein relates to computerized data examination, e.g., data within a document, for one or more changes, and to other action depending upon the results of the examination.

SUMMARY OF THE INVENTION

Embodiments of the invention provide for computerized data examination for one or more changes, and for other action depending upon the results of the examination.

For example, an embodiment of the invention comprises a computerized system and/or a method for examining data, which, in this embodiment, is represented by electronic documents, for one or more changes. Electronic documents are meant herein in a broad sense and may encompass many types of documents, including files and other structures for storage and presentation of various types of data in electronic form, including text documents and graphic documents, whether created electronically or converted into electronic form. Examining an electronic document is also meant herein in a broad sense and may encompass monitoring, analysis, comparison and other operations or processing.

Embodiments of the invention may examine a document which is subject to change for changes in any suitable way. According to one embodiment, two documents are electronically compared. One document may be considered a reference against which the other document which is subject to change is compared for changes.

In accordance with an embodiment of the invention, documents are examined for the occurrence of one or more differences, e.g., a change or changes such as modification, addition, deletion, moving, etc.

In accordance with an embodiment of the invention, documents are examined for the occurrence of such a difference or differences which include a given term or terms. A document may be examined for the occurrence of the particular term or terms, e.g., a search term or terms, anywhere in the document or only in part of the document, e.g., a changed part.

In accordance with an embodiment of the invention, a user selects a document subject to change for monitoring and defines at least one monitoring parameter, e.g., the duration of monitoring, an alert frequency or frequencies, formats, system output parameter(s), and, if desired, one or more search terms.

In accordance with an embodiment of the invention, a selected document subject to change ("monitored document") is stored as an updatable or an editable reference of the monitored document ("updatable reference") with which the monitored document will be compared for future differences. At this point, the updatable reference includes the material in the monitored document that is to be monitored. For example, the updatable reference may include additional data, e.g., meta data such as tags. At a later time, when the monitored document may have undergone change, the monitored document and the updatable reference are compared to determine whether any changes have occurred to the monitored document. Any changes or selected changes included in the monitored document are made to the updatable reference, i.e., the updatable reference is edited or changed to reflect any such changes so that the updatable reference again includes all of the material to be monitored in the monitored document.

The terms monitored document and updatable reference have been selected and are used for ease and clarity of description. While the monitored document is subject to change, e.g., independent of the updatable reference, and may be considered editable, the updatable reference is updated or edited based on the condition of the monitored document.

According to an embodiment of the invention, all prior material in the updatable reference is retained after changes have been made thereto, so that the updatable reference includes material representing all versions of the monitored document. This enables any version of the monitored document to be created from the latest updatable reference.

In accordance with an embodiment of the invention, the document examination system stores the latest updatable reference, which e.g., includes material representing all versions of the monitored document, in a database.

In accordance with another embodiment of the invention, as opposed to storing only the latest updatable reference, raw information is extracted from the monitored document and stored in an updatable reference that receives such raw information when examination indicates that the monitored document has changed. The extraction may comprise any method or combination of methods such as web crawling, flat file parsing, natural language processing, or screen scraping.

In accordance with an embodiment of the invention, the web crawling, flat file parsing, and natural language processing extraction methods, or other extraction methods, may detect relationships between data elements which can serve as syntactic and structural cues.

In accordance with an embodiment of the invention, the raw information extracted from the monitored document is converted into a desired format, for example, a unified XML format, and stored as the updatable reference. In accordance with an embodiment of the invention, logical entities of the monitored document are included in the stored updatable reference, and at a later time, logical entities of the monitored document and of the updatable reference thereof are compared for changes.

In accordance with an embodiment of the invention, within a monitoring duration and at preprogrammed intervals, logical entities of the monitored document, and logical entities of the updatable reference are compared. If the system identifies one or more differences between the logical entities of the two documents, the updatable reference is edited to include the identified differences. In accordance with an embodiment of the invention, each edit of the updatable reference is tagged with a revision identification tag. For example, an insertion may be represented with an "<i>" identification tag, while a deletion may be represented with a "<d>" identification tag.

In accordance with an embodiment of the invention, analysis determines if the edits applied to the updatable reference are actual changes to logical entities or are instead logical entities which have simply moved, or "drifted," in position ("drift")

In accordance with an embodiment of the invention, if the system does not identify drift, an alert operation commences to alert a user of the change.

In accordance with an alternative embodiment of the invention, if the system does not identify drift, the change in the logical entities is searched for the one or more search terms defined or selected by a user, allowing for the ability to alert users only when there is a change relating to the one or more search terms.

According to an embodiment of the invention, various output documents may be provided for display. An output document may be constructed from an updatable reference document and may include material representing one or more of: a complete reconstruction of the monitored document with all changes thereto after the given time; additions to the monitored document after the given time; deletions to the monitored document after the given time; and material representing modifications of the monitored document after the given time. Also, an output document may be provided representing an entire changed document without markup, the entire changed document with changes marked or highlighted, only the changed portions of the changed document, only additions, only deletions, only formatting changes, only certain types of modifications, or any combination of the above.

According to embodiments of the invention different output view options for display of an output document may be specified by a user, i.e., the particular form of the output document is user selectable. For example, output options may include selection of one or more of the output documents described herein.

According to embodiments of the invention, an automated data processing system is provided comprising a memory configured to store data, documents and/or references described herein, and at least one processor (or at least one computer) configured to carry out functionality described herein.

According to embodiments of the invention, a computer readable medium is provided which stored computer code that causes at least one processor (or at least one computer) to carry out the functionality described herein. The at least one processor or computer may comprise a server computer, a client computer or both.

According to one application of the invention, the monitored document, a court docket sheet, is examined. For example, a court docket sheet may be electronically stored in a data store as a monitored document that is accessible to a computerized system and method. The electronically stored docket sheet may be made available by court or a service. Computerized systems and methods according to embodiments of the invention access the docket sheet (the monitored document) at a given time and store logical entities of the docket sheet and/or data relating to the docket sheet as the updatable reference. Such systems and methods access the docket sheet (monitored document) after the given time and perform the process(es), described herein.

BRIEF DESCRIPTION OF THE DRAWINGS

The invention is illustrated in the figures of the accompanying drawings, which are meant to be exemplary and not limiting, and in which like references are intended to refer to like or corresponding things.

DETAILED DESCRIPTION

Figure 1:
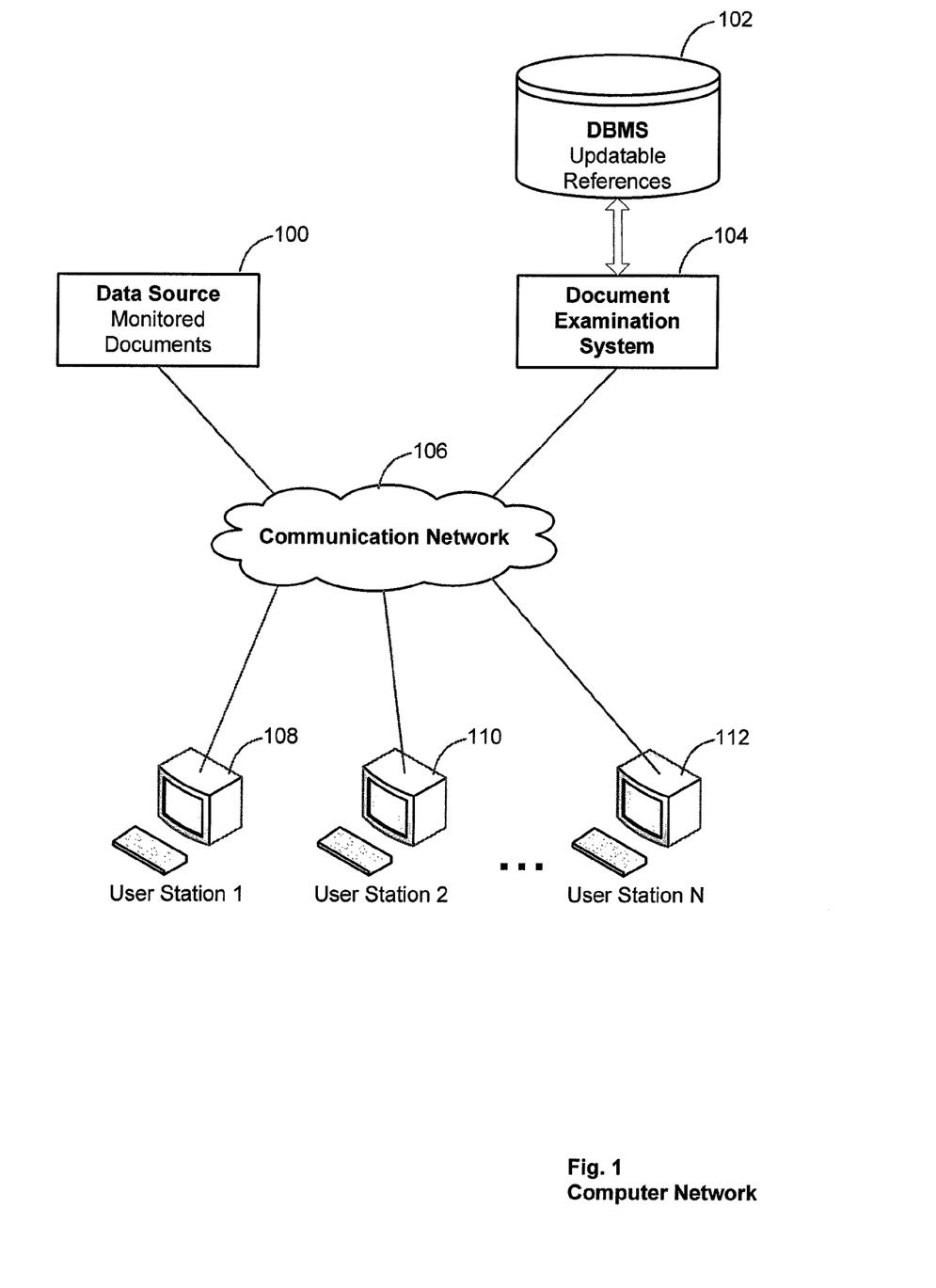
FIG. 1 is a block diagram of a computer network such as may be used in an embodiment of the invention.

FIG. 1 illustrates a computer network such as may be used in an embodiment of the invention. The network includes a data source 100, document examination system 104, database management system (DBMS) 102, communication network 106, and one or more user stations 108, 110, and 112. The document examination system 104 interfaces with communication network 106 for communicating with the data source 100 and the user stations 108, 110, and 112. The document examination system 104 interfaces with DBMS 102, allowing information to be supplied to and retrieved from DBMS 102. Communication network 106 may be any suitable network for communicating and exchanging information between and/or among the elements represented in FIG. 1, including the Internet, local area network (LAN), wide area network (WAN), a wireless network, an intranet, a private network, a public network, a switched network, an enterprise network, a virtual private network, or other networks.

Data source 100 is a source of information that comprises one or more monitored documents. For example, it could be a DBMS, workflow management system, or content management system, e.g., a blog. According to an embodiment of the invention, data source 100 may be an electronic provider of court dockets.

At a first time, the document examination system 104, through the communication network 106, reads a monitored document from data source 100 and stores an extracted copy as an updatable reference in DBMS 102. At a second time, the document examination system extracts the monitored document in data source 100, which may or may not have been changed, through communication network 106 and compares it to the latest updatable reference stored in DBMS 102. The document examination system 104 determines if there is a change between the monitored document, read at a second time, and the latest updatable reference previously stored in DBMS 102. If there is a change between these documents, an alert may be launched by the document examination system 104, through the communication network 106, to a predefined user or user stations 108, 110, and 112, as described below.

Figure 2:
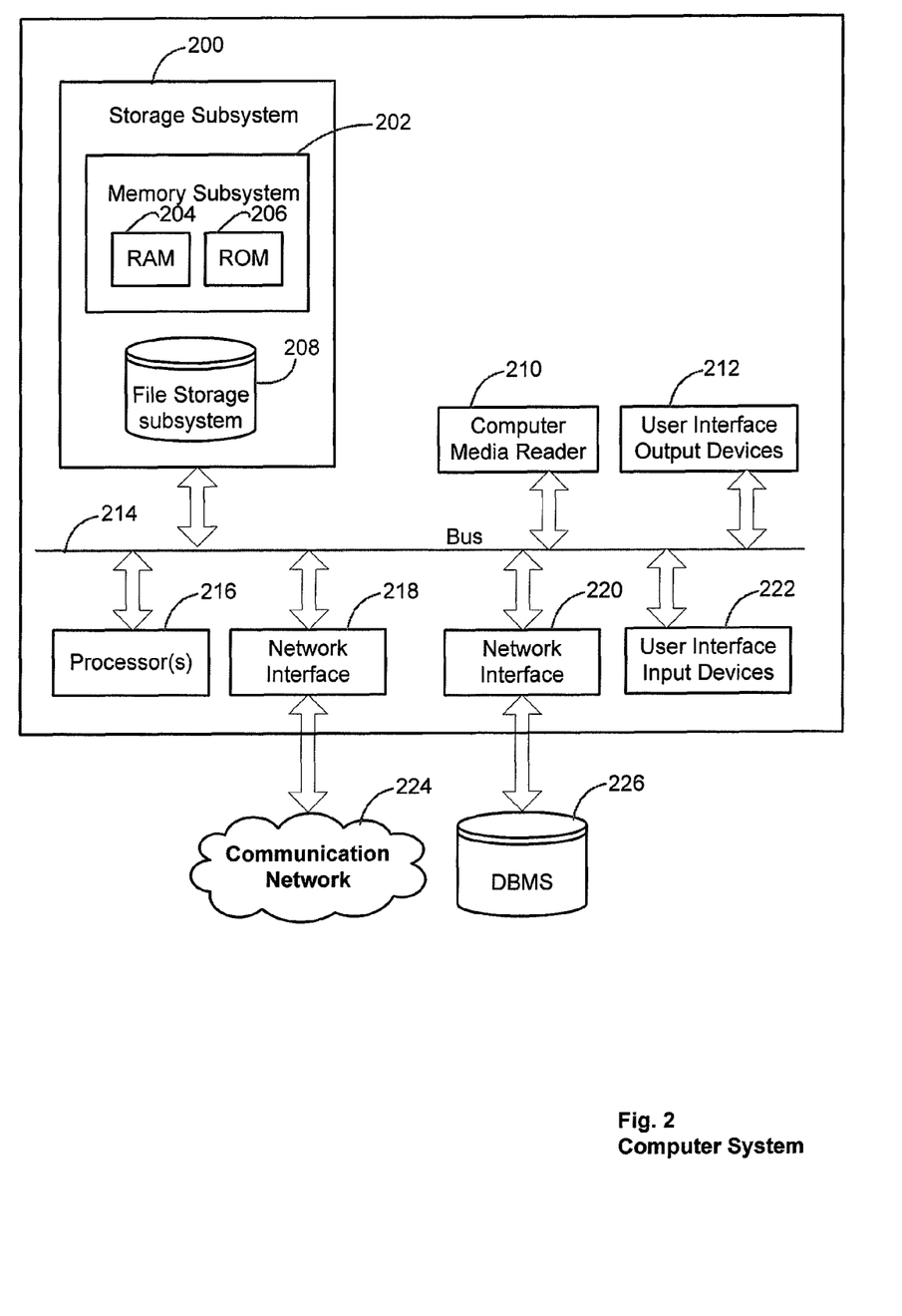
FIG. 2 is a block diagram of a computer system such as may be used in an embodiment of the invention.

FIG. 2 illustrates a computer system such as may be used in an embodiment of the invention. The computer system includes at least one processor 216 that communicates with one or more peripheral devices via bus 214. These peripheral devices may include a storage subsystem 200 comprising a memory subsystem 202 and a file storage subsystem 208, user interface input devices 222, user interface output devices 212, and computer media reader 210. Network interface 218 provides an interface to communication network 224, while network interface 220 provides an interface to DBMS 226. Although FIG. 2 illustrates two network interfaces, 218 and 220, alternate implementations are possible.

User interface output devices 212 include suitable types of devices and ways to output information from the computer system. Likewise, user interface input devices 222 includes suitable types of devices and ways to input information the computer system. Computer media reader 210 includes suitable types of removable media devices.

Storage subsystem 200 provides the basic storage functionality of the computer system. For example, it may include the basic data and programs required for proper functionality of the computer system. Further, it may provide a way to temporarily store relevant data such as one or more search terms, document information, user information, and the like, or may serve as a repository for storing several versions of a document.

Memory subsystem 202 may include a number of memories including a main random access memory (RAM) 204 for storage of instructions and data during program execution and read only memory (ROM) 206 in which fixed instructions are stored. File storage subsystem 208 provides persistent storage for program and data files, and may include a hard disk drive, a floppy disk drive, a compact disc read only memory (CD-ROM) drive, an optical drive, removable media cartridges, or other types of storage media. One or more of the drives may be located at remote locations on other connected computers.

DBMS 226 stores and manages information. Part or all of the functions specified in the file storage subsystem 208 may be shared by DBMS 226. It may accept requests for data through the network interface 226 and may instruct an operating system to transfer appropriate data.

One of ordinary skill in the art would recognize that the computer system depicted in FIG. 2 may be continuously changing and improving. Thus, the computer system may have other configurations. FIG. 2 is intended only as an example for the purposes of illustrating a preferred embodiment of the computer system.

Figure 3:
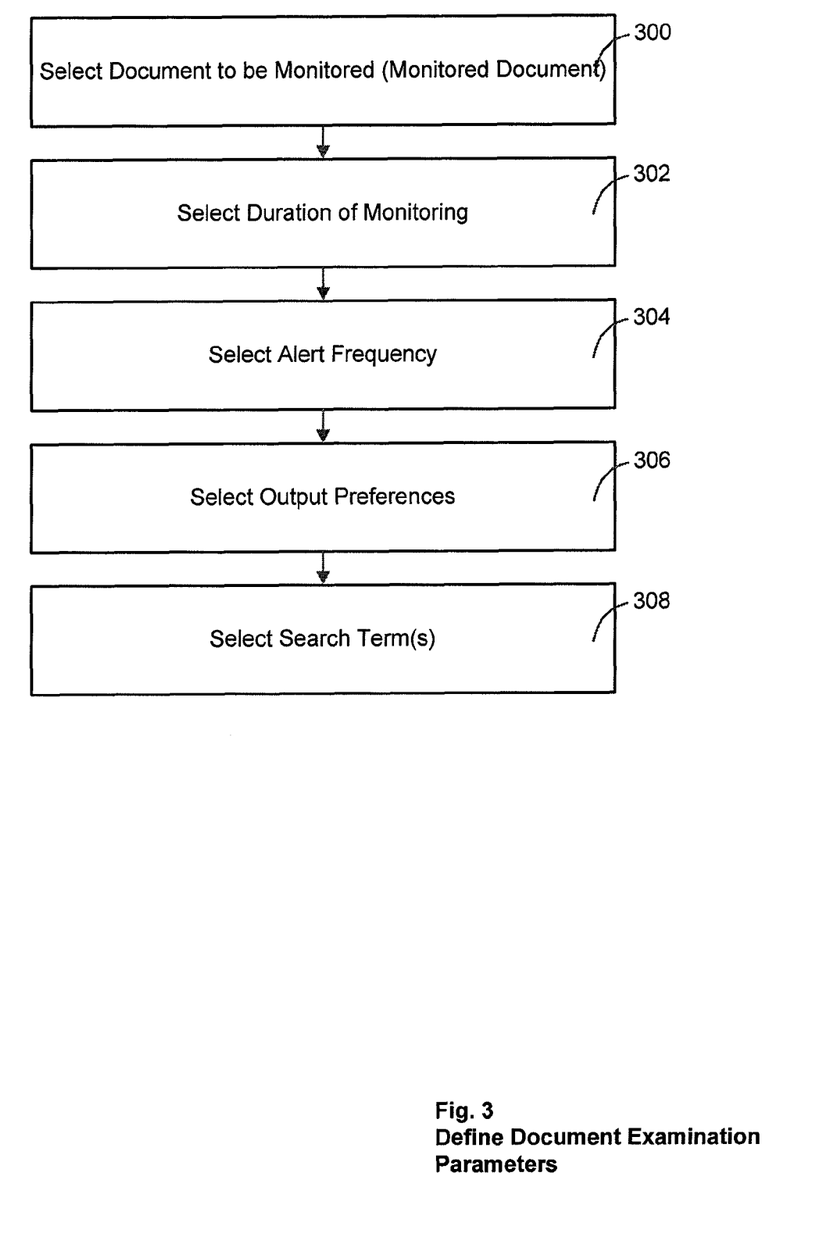
FIG. 3 is a flowchart of defining document examination parameters, according to an embodiment of the invention.

FIG. 3 is a flowchart of defining parameters for document examination, according to an embodiment of the invention. The flow depicted in FIG. 3 may be triggered by one or more events such as elapsed time or initiation by a user.

In block 300, a user selects a document to be monitored. Documents may be selected from a multitude of different types such as documents that can be versioned or changed, including court docket sheets or compilations.

In block 302, a user defines the duration of monitoring. This time period may be limited by several factors including a contract period, whether the monitored document is expected to change in the future, specification by a user, and the like. For example, a user may specify a particular document be monitored for a one year period starting on a specific date, thereby limiting the duration of the monitoring service to the specified time period.

In block 304, a user specifies how often a document alert, described in detail below, should occur. In one embodiment, document alerts may be specified at user-determined intervals, such as hourly, daily, or weekly. In another embodiment, the user may choose from pre-determined intervals such as minimum, normal, or maximum.

In block 306, a user specifies a plurality of parameters which relate to the system output. The parameters may comprise the features of the output produced by the system and the type of alert associated with the output. For example, output options may include viewing as an output document an entire monitored document as changed without markup, the entire monitored document with changes marked or highlighted, only the changed portions of the monitored document, only additions, only deletions, only formatting changes, only certain types of modifications, or any combination of the above. The user may choose such output options based on any change in the monitored document or only those changes related to a specific search term within the document.

Further in block 306, the user may define formatting of the output document such as color coding or industry-specific coding. For example, if a section of the document or a search term appears as an addition to the document, the inserted section or term may be colored in green to indicate the insertion in an output document. Similarly, if a section of the document or a search term appears as a change to the document, the changed section or search term may be colored in blue to indicate the change. As another example, if a search term is deleted, the deleted text may be stricken, thereby indicating deleted text.

Also in block 306, the user may define an alert type such as an electronic notification to the user comprising an alert message and/or an electronic link to the output document.

In block 308, the user may enter, if desired, one or more search terms. In the preferred embodiment, the entering of one or more search terms provides the ability to alert users only when there is a change relating to the one or more search terms in the monitored document.

Start

Figure 4:
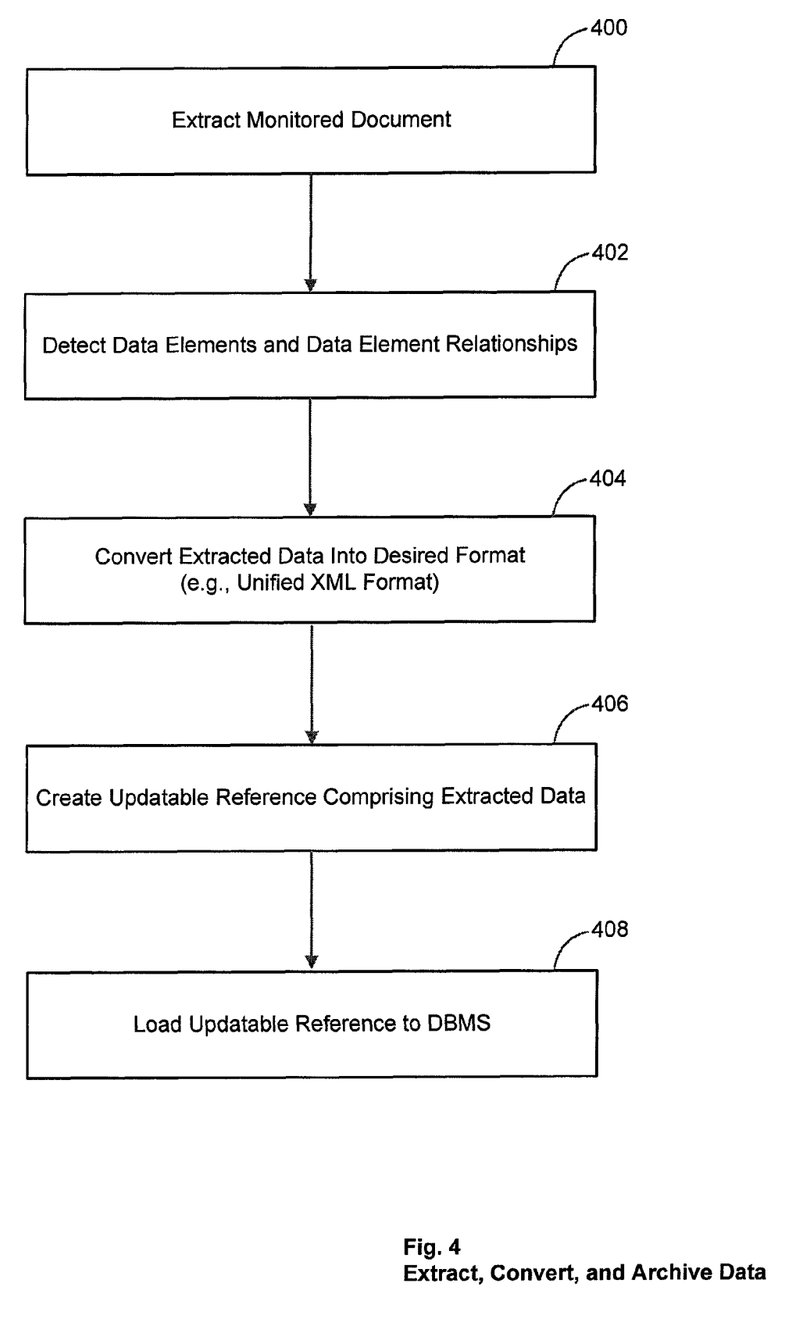
FIG. 4 is a flowchart of extracting, converting, and archiving data from a monitored document, according to an embodiment of the invention.

In block 400 of FIG. 4, raw information is extracted from the monitored document, which is subject to change, previously selected in block 300 of FIG. 3. The extraction may comprise any method or combination of methods such as web crawling, flat file parsing, natural language processing, or screen scraping.

In an embodiment utilizing web crawling as an extraction method in block 400, the structure of an input document, e.g., the monitored document, is analyzed to detect attributes of data elements that can be used for identification. Such attributes may include markup tags, the absolute or relative position of the data element, or the format in which the data element appears, e.g., a heading, table, or indented paragraph. As an example, the system may detect, in a court document to be monitored, that attorney and party data elements are encapsulated in metadata or markup tags such as "<attorney>" and "<party>". Similarly, attorney and party data elements in a particular court document may appear in a known absolute or relative position. Alternatively, the data elements may appear in a table of a known particular size, e.g., five rows by three columns. Data elements can be reliably targeted and extracted based on these identifying attributes.

In an embodiment utilizing flat file parsing as an extraction method in block 400, input documents are parsed based on file structure, e.g., a comma-separated format or fixed-width delimitation. For example, the system may identify that a data element including attorney information is positioned, in a file, as the third sequential element, where each element is delimited by a comma character. Alternatively, the system may identify that a data element including attorney information is positioned between bytes 20 and 30 in a file.

In an embodiment utilizing natural language processing as an extraction method in block 400, the system may parse a document to identify data elements based on syntactic and structural cues. For example, the system may process a document to identify titles such as the name of a court, law firm, or honorific and then identify a data element routinely associated with the title, or cue. As another example, an address processor may identify a street address based on known addressing conventions and may further parse the data element into street number, street name, city, state, and zip code.

Such processing may be rule-based, database-driven, where the database includes tables of known syntactic and structural cues, or may utilize artificial intelligence to properly identify data elements. Further, the processing logic may be optimized for a particular document format such as the unique address formatting of a particular country or a formatting style of a particular court. Likewise, processing may identify missing or improperly formatted data elements such as a missing zip code based on rules, database tables, or artificial intelligence.

In another embodiment, in block 400, the web crawling, flat file parsing, and natural language processing extraction methods described above, or other extraction methods, may be combined. For example, flat file parsing may identify that an address block is positioned between bytes 100 and 200 in a particular document, with no ability to parse the address block into separate data elements. The extraction process may then process the address block with natural language processing to identify street number, street name, city, state, and zip code. As above, such processing may be rule-based, database-driven, or may utilize artificial intelligence.

In block 402, the web crawling, flat file parsing, and natural language processing extraction methods described above, or other extraction methods, may detect relationships between data elements which can serve as syntactic and structural cues. For example, a data element representing an attorney name may relate to a particular data element representing a party name. In this example, the extraction process can identify that a particular party is associated with a particular attorney.

In block 404, the raw information extracted from the monitored document in the above blocks is converted into a desired format, for example, a unified XML format. In block 406, the raw information, now stored in a desired format, is stored as an updatable reference.

In an alternative embodiment, blocks 404 and 406 may be substituted with a procedure wherein the updatable reference is created as a copy of the monitored document, as opposed to the extraction procedure described in the preceding paragraph.

In block 408, as shown in FIG. 1, the document examination system 104, through the communication network 106, stores the extracted copy of the updatable reference in DBMS 102, editing or updating the previous updatable reference if a previous updatable reference already exists.

Figure 5:
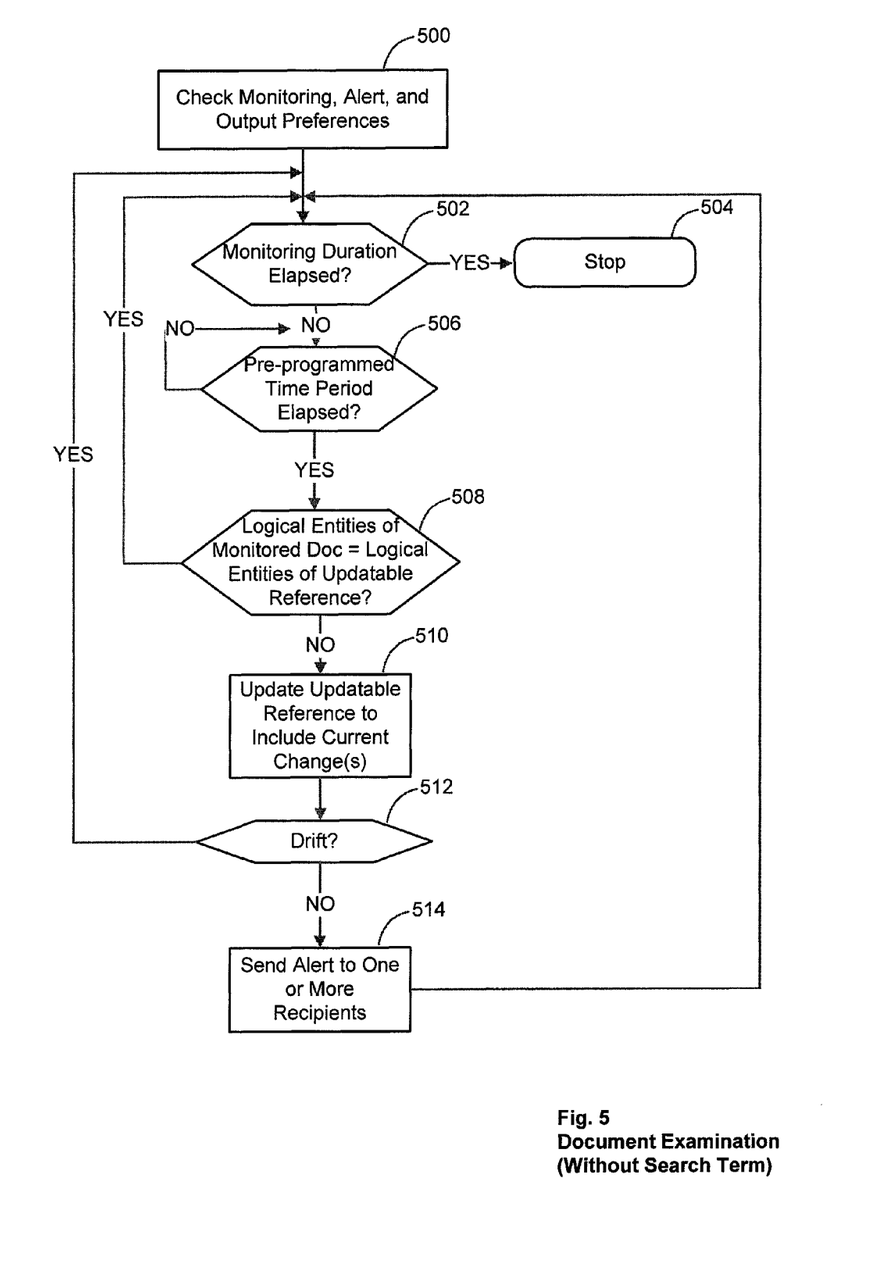
FIG. 5 is a flowchart of a document examination system where a search term is not used, according to an embodiment of the invention.

FIG. 5 is a flowchart of a document examination system where a search term is not used, according to an embodiment of the invention. In block 500, the system checks the monitoring, alert, and output preferences previously defined by the user in blocks 300 through 306 of FIG. 3 which are applied as described below.

Block 502 determines if the monitoring duration has elapsed. As described above in reference to block 302 of FIG. 3, a user may specify that a document be monitored for a particular time period, i.e., for a one year period starting on a specific date, thereby limiting the duration of the monitoring service to the specified time period. If the monitoring duration has elapsed, monitoring will stop in block 504. In an embodiment, a final document alert or other electronic notification may be sent to the user indicating that the document will no longer be monitored.

If the monitoring duration has not elapsed, block 506 identifies whether the alert frequency, or pre-programmed time period, criteria are met. As described above in reference to block 304 of FIG. 3, document alerts may be specified at user-determined intervals such as hourly, daily, or weekly. If the criteria of block 506 are not met, the system will delay further processing until such criteria are met, e.g., until the time at which monitoring should commence. In an alternative embodiment, the process returns to block 502 to ensure that the next monitoring time is within the monitoring duration.

If the alert frequency criteria are met, block 508 compares the logical entities of the monitored document, to the logical entities of the latest updatable reference. In the preferred embodiment, the monitored document represents a current version of a document subject to change while the updatable reference represents a previously stored or archived and editable reference of the monitored document, e.g., with identification tags, as described below. More specifically, in the preferred embodiment, the monitored document represents a current document from data source 100 in FIG. 1, while the updatable reference represents an editable reference thereof from DBMS 102 in FIG. 1, which was extracted and archived through the process shown in blocks 400 through 408 of FIG. 4.

The logical entities of the monitored and updatable reference may comprise key information such as parties, attorneys, entries, and the like. If block 508 does not identify a change between the logical entities of the two documents, the process returns to block 502.

If block 508 does identify one or more differences between the logical entities of the monitored document and the editable version, the updatable reference is edited in block 510 to reflect the changed logical elements. Further, each change to the updatable reference is tagged with a revision identification which may comprise a letter or letters, a number or numbers, symbols, a date-stamp, or any combination thereof. For example, an insertion may be represented with an "<i>" identification tag, while a deletion may be represented with a "<d>" identification tag. The identification tags may be date-stamped for archiving proposes or for the purpose of recreating a document as it appeared on a certain date. For example, the system can be set to ignore all logical entities associated with an "<i>" or "<d>" tag having a date-stamp after a certain date, thereby presenting the user with a document as it appeared on a certain date. In the preferred embodiment, such versioning and recreation can be accomplished based on a single editable version through the use of a unified format, as shown in block 404 of FIG. 4 and as described above, together with the identification tags.

Block 512 is an analytic stage which determines if the edits applied to the updatable reference in block 510 are actual changes to logical entities or are instead logical entities which have simply moved, or drifted, in position. In an embodiment, the drifting of logical entities may not necessarily result in the issuance of a document alert. Block 512 determines if the updates applied to the updatable reference in block 510 represent drift by comparing the deleted logical entities in the updatable reference to the inserted logical entities in the monitored document.

Further, in an embodiment, unique keys embedded in each entity may be utilized in block 512 to improve the accuracy of the comparison of the monitored document and the editable version.

In block 512, if the deleted logical entities in the updatable reference match inserted logical entities in the monitored document, the system assumes that drift has occurred and that a document alert is unnecessary for this particular change. At such time, the process returns to block 502.

If block 512 does not identify drift in at least one of the changed logical entities, alert operation 514 commences according to the preferences specified in block 500. The alert operation may comprise preparing an output document and notification to the appropriate user or users. The process then returns to block 502.

Figure 6:
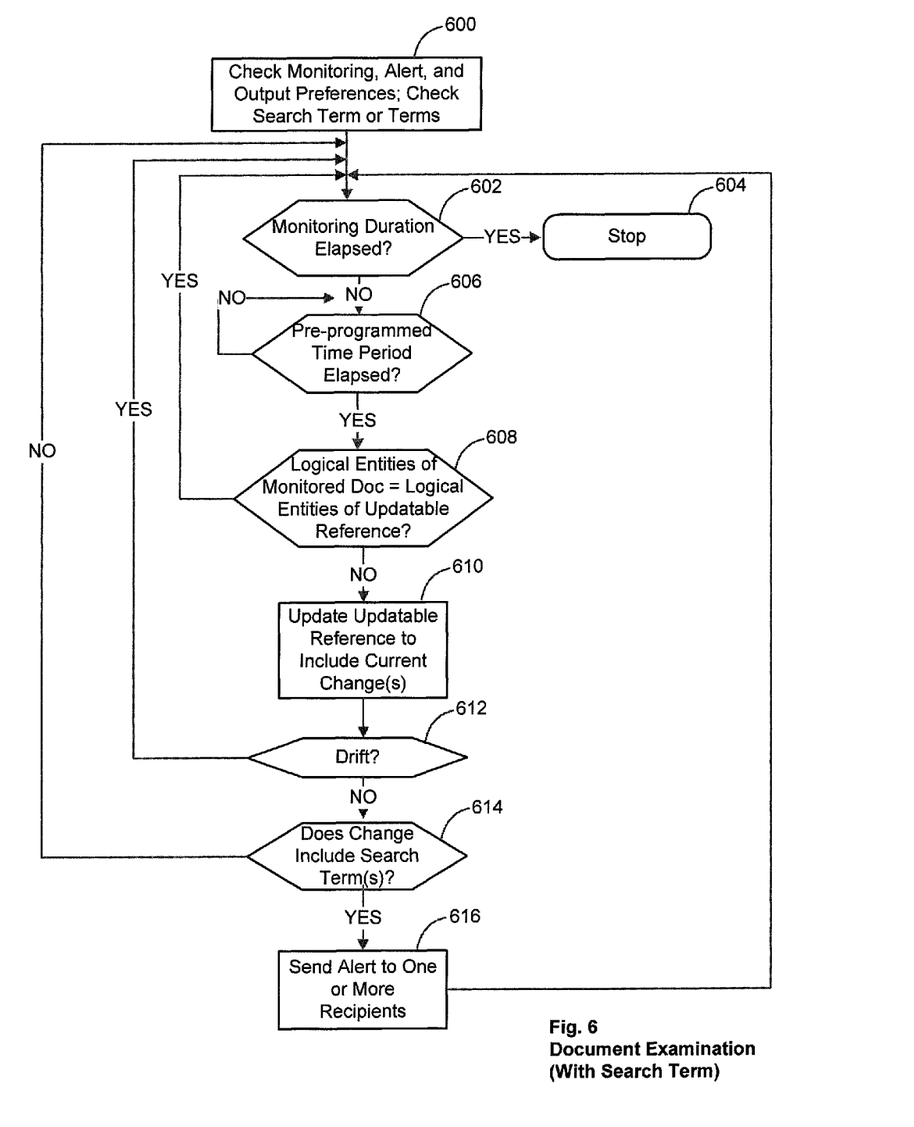
FIG. 6 is a flowchart of a document examination system where a search term is used, according to an embodiment of the invention.

FIG. 6 is a flowchart of a document examination system where a search term is not used, according to an embodiment of the invention. In block 600, the system checks the monitoring, alert, and output preferences previously defined by the user in blocks 300 through 306 of FIG. 3 which are applied as described below.

Block 602 determines if the monitoring duration has elapsed. As described above in reference to block 302 of FIG. 3, a user may specify that a document be monitored for a particular time period, i.e., for a one year period starting on a specific date, thereby limiting the duration of the monitoring service to the specified time period. If the monitoring duration has elapsed, monitoring will stop in block 604. In an embodiment, a final document alert or other electronic notification may be sent to the user indicating that the document will no longer be monitored.

If the monitoring duration has not elapsed, block 606 identifies whether the alert frequency, or pre-programmed time period, criteria are met. As described above in reference to block 304 of FIG. 3, document alerts may be specified at user-determined intervals such as hourly, daily, or weekly. If the criteria of block 606 are not met, the system will delay further processing until such criteria are met, e.g., until the time at which monitoring should commence. In an alternative embodiment, the process returns to block 602 to ensure that the next monitoring time is within the monitoring duration.

If the alert frequency criteria are met, block 608 compares the logical entities of the monitored document version to the logical entities of the latest updatable reference. In the preferred embodiment, the monitored document represents a current version of a document subject to change while the updatable reference represents a previously archived and editable reference of the monitored document, e.g., with identification tags, as described below. More specifically, in the preferred embodiment, the monitored document represents a current document from data source 100 in FIG. 1, while the updatable reference represents an editable reference thereof from DBMS 102 in FIG. 1, which was extracted and archived through the process shown in blocks 400 through 408 of FIG. 4.

The logical entities of the monitored and updatable reference may comprise key information such as parties, attorneys, entries, and the like. If block 608 does not identify a change between the logical entities of the two documents, the process returns to block 602.

If block 608 does identify one or more differences between the logical entities of the monitored document and the updatable reference, the updatable reference is edited in block 510 to reflect the changed logical elements. Further, each change to the updatable reference is tagged with a revision identification which may comprise a letter or letters, a number or numbers, symbols, a date-stamp, or any combination thereof. For example, an insertion may be represented with an "<i>" identification tag, while a deletion may be represented with a "<d>" identification tag. The identification tags may be date-stamped for archiving proposes or for the purpose of recreating a document as it appeared on a certain date. For example, the system can be set to ignore all logical entities associated with an "<i>" or "<d>" tag having a date-stamp after a certain date, thereby presenting the user with a document as it appeared on a certain date. In the preferred embodiment, such versioning and recreation can be accomplished based on a single updatable reference through the use of a unified format, as shown in block 404 of FIG. 4 and as described above, together with the identification tags, as described immediately above.

Block 612 is an analytic stage which determines if the updates applied to the updatable reference in block 610 are actual changes to logical entities or are instead logical entities which have simply moved, or drifted, in position. In an embodiment, the drifting of logical entities may not necessarily result in the issuance of a document alert. Block 612 determines if the updates applied to the updatable reference in block 610 represent drift by comparing the deleted logical entities in the updatable reference to the inserted logical entities in the monitored document.

Further, in an embodiment, unique keys embedded in each entity may be utilized in block 612 to improve the accuracy of the comparison of the monitored document and the updatable reference.

In block 612, if the deleted logical entities in the updatable reference match inserted logical entities in the monitored document, the system assumes that drift has occurred and that a document alert is unnecessary for this particular change. At such time, the process returns to block 502.

If block 614 does not identify drift in at least one of the changed logical entities, the change in the logical entities is searched for the one or more search terms entered according to block 600, allowing for the ability to alert users only when there is a change relating to the one or more search terms in the monitored document. If the one or more search terms are not found in the changed entities, the process returns to block 602. If the one or more search terms are found in the changed entities, alert operation 616 commences according to the preferences specified in block 600. The alert operation may comprise preparing an output document and notification to the appropriate user or users. The process then returns to block 602.

FIGS. 5 and 6 are merely illustrative of embodiments incorporating the present invention and does not limit the scope of the invention as recited in the claims. One of ordinary skill in the art would recognize other variations, modifications, and alternatives.

Figure 7:
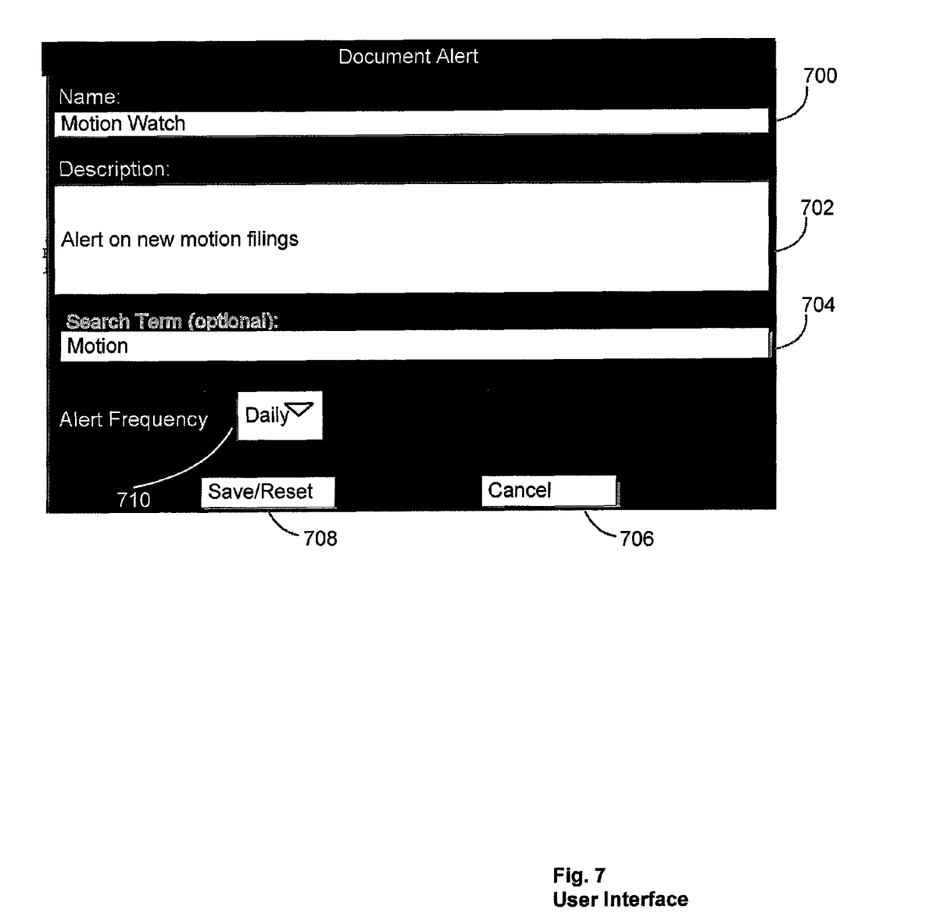
FIG. 7 depicts a graphical user interface such as may appear on an electronic display device to prompt a user to specify a document alert, according to an embodiment of the invention.

FIG. 7 depicts a graphical user interface such as may appear on an electronic display device to prompt a user to specify a document alert, according to an embodiment of the invention. FIG. 7 is merely illustrative of an embodiment incorporating the present invention and does not limit the scope of the invention as recited in the claims. One of ordinary skill in the art would recognize other variations, modifications, and alternatives.

The interface of FIG. 7 includes field 700 into which a user may enter the name of the document or documents to be monitored. In field 702, a user may define a description of this particular monitoring task for future reference, such as a description of the monitored document or an explanation of the reasons for monitoring the document. In field 704, a user may specify one or more search terms, thereby narrowing future document alerts to changes related to the one or more search terms. Through drop-down menu 710, a user may specify the alert frequency. In an embodiment of the invention, the alert frequency may be selected from a drop-down menu which offers a multiplicity of frequency choices, e.g. daily or monthly. In another embodiment, the alert frequency may be selected by an interface representing a dial. In yet another embodiment, the alert frequency may be entered in a text field which may specify an interval or a formula used to define the appropriate alert interval or alert dates.

Button 708 is an electronic symbolic button which allows a user to save or reset the information entered into the interface. According to an embodiment, several versions of the information entered may be saved.

Button 706 is an electronic symbolic button which allows a user to cancel the information entered into the interface.

Figure 8:
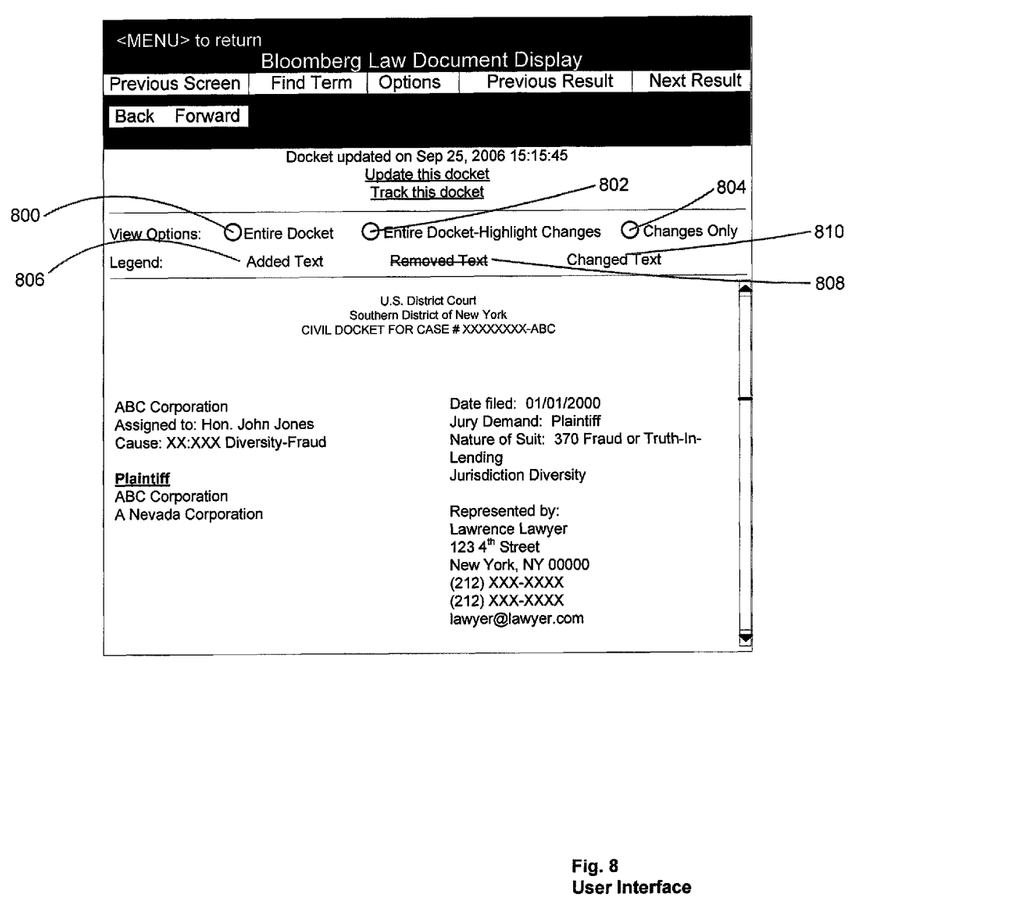
FIG. 8 depicts a graphical user interface such as may appear on an electronic display device to allow a user to adjust viewing options of a document, according to an embodiment of the invention.

FIG. 8 depicts a graphical user interface such as may appear on an electronic display device to allow a user to adjust viewing options of an output document, according to an embodiment of the invention. FIG. 8 is merely illustrative of an embodiment incorporating the present invention and does not limit the scope of the invention as recited in the claims. One of ordinary skill in the art would recognize other variations, modifications, and alternatives.

In one embodiment of the present invention, output options may include viewing an entire changed document without markup, the entire output document with changes marked or highlighted, only the changed portions of the document, only additions, only deletions, only formatting changes, only certain types of modifications, or any combination of the above. Such options are illustrated in the view options section of FIG. 8 as buttons 800, 802, and 804.

In an embodiment, the user may choose such output options based on any change in the document or based only on changes related to a specific search term within the document.

In another embodiment, output options may define coding, such as color coding or format coding, of the output document. For example, if a section of the document or a search term appears as an addition to the document, the inserted section or term may be colored in green to indicate the insertion. Similarly, if a section of the document or a search term appears as a change to the document, the changed section or search term may be colored in blue to indicate the change. As another example, if a search term is deleted, the deleted text may be stricken, thereby indicating deleted text. Such options are illustrated in the legend of FIG. 8 as labels 800, 802, and 804.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A computer implemented method for examining data, comprising:
    identifying one or more differences between a monitored document, which is subject to change and includes one or more logical entities, and an updatable reference that includes, at a given time, the logical entities of the monitored document and all of the material to be monitored in the monitored document;
    determining that one or more of the differences does not represent drift, where drift is a change in position within the document of a logical entity that has not itself been changed;
    testing one or more of the differences determined not to represent drift using one or more criteria; and
    if one or more of the one or more criteria is satisfied, indicating the satisfaction thereof.

2. The method of claim 1, wherein the monitored document is a court docket.

3. The method of claim 1, wherein the one or more criteria comprise the presence, within at least one of the one or more identified differences, of at least one search term.

4. The method of claim 1, wherein identifying differences comprises:
    comparing the logical entities in the monitored document to the logical entities in the updatable reference.

5. The method of claim 4, comprising changing the updatable reference to include any differences between the logical entities of the monitored document and of the updatable reference.

6. The method of claim 1, wherein the identifying, testing, and indicating steps occur at specified intervals after the given time.

7. The method of claim 1, wherein indicating the satisfaction of the one or more criteria comprises displaying an indication of the satisfaction on one or more electronic display devices.

8. The method of claim 7, comprising an electronic link associated with the indication displayed on one or more display devices.

9. The method of claim 1, comprising providing for election display an output document constructed from an updatable reference document and including material representing one or more of: a complete reconstruction of the monitored document with all changes thereto after the given time; additions to the monitored document after the given time; deletions to the monitored document after the given time; and modifications of the monitored document after the given time.

10. The method of claim 9, comprising displaying all or part of the output document on one or more electronic display devices.

11. The method of claim 8, comprising providing for user selection of material to be included in an output document.

12. The method of claim 1, comprising providing for electronic display a first output document including changes to the monitored document without markup identifying the changes and a second output document including changes to the monitored document with markup to indicate the changes.

13. The method of the claim 12, comprising providing for user selection of the first and second output documents for display on one or more electronic display device.

14. The method of claim 2, wherein at least one of the logical entities in the monitored document represents a party to an action.

15. The method of claim 2, wherein at least one of the logical entities in the monitored document represents a docket entry.

16. An automated data processing system for monitoring data for changes, comprising:
    a monitored document, which is subject to change and includes one or more logical entities;
    an updatable reference of the monitored document at a given time, the updatable reference including the logical entities of the monitored document and all of the material to be monitored in the monitored document;
    a memory configured to store one or more criteria and the updatable reference; and
    at least one processor configured to:
        identify one or more differences between the monitored document and the updatable reference;
        determine that one or more of the identified differences does not represent drift, where drift is a change in position within the document of a logical entity that has not itself been changed;

determine if the one or more criteria is satisfied in an identified difference between the monitored document and the updatable reference, the identified difference having been determined not to represent drift;

provide notification if at least one of the one or more criteria is satisfied; and update the updatable reference to include any differences between the monitored document and the updatable reference.

17. The system of claim 16, wherein the monitored document is a court docket.

18. The system of claim 16, wherein the one or more criteria comprises the presence, within at least one of the identified differences, of at least one search term.

19. The system of claim 16, wherein identifying differences comprises:

retrieving the monitored document; and comparing the logical entities in the monitored document to the logical entities in the updatable reference.

20. The system of claim 19, wherein the identifying of one or more differences occurs at specified intervals.

21. The system of claim 20, wherein providing notification comprises providing notification for display on one or more electronic display devices.

22. The system of claim 21, comprising an electronic link associated with the notification provided for display.

23. The system of claim 16, wherein the at least one processor is configured to provide an output document constructed from an updatable reference document and including material representing one or more of: a complete reconstruction of the monitored document with all changes thereto after the given time; additions to the monitored document after the given time; deletions to the monitored document after the given time; and modifications of the monitored document after the given time.

24. The system of claim 23, wherein the at least one processor is configured to cause display of all or part of the output document on one or more electronic display devices.

25. The system of claim 24, wherein the at least one processor is configured to provide for user selection of material to be included in an output document.

26. The system of claim 16, wherein the at least one processor is configured to provide for electronic display of a first output document including changes to the monitored document without markup identifying the changes and a second output document including changes to the monitored document with markup to indicate the changes.

27. The system of claim 26, wherein the processor is configured to cause display of an output document on one or more electronic display devices based on user selection thereof.

28. The automated data processing system of claim 17, wherein at least one of the logical entities in the monitored document represents a party to an action.

29. The automated data processing system of claim 17, wherein at least one of the logical entities in the monitored document represents a docket entry.

30. A computer readable medium storing computer code that causes at least one computer to:

identify one or more differences between a monitored document, which is subject to change and includes one or more logical entities, and an updatable reference that includes, at a given time, the logical entities of the monitored document and all of the material to be monitored in the monitored document;

determine that one or more of the identified differences does not represent drift, where drift is a change in position within the document of a logical entity that has not itself been changed;

determine if the one or more criteria is satisfied in an identified difference between the monitored document and the updatable reference, the identified difference having been determined not to represent drift;

provide notification if one or more of the one or more criteria is satisfied; and update the updatable reference to include any differences between the monitored document and the updatable reference.

31. A computer readable medium storing computer code that causes at least one computer to carry out a method comprising:

identifying one or more differences between a monitored document, which is subject to change and includes one or more logical entities, and an updatable reference that includes, at a given time, the logical entities of the monitored document and all of the material to be monitored in the monitored document;

determining that one or more of the differences does not represent drift, where drift is a change in position within the document of a logical entity that has not itself been changed;

testing one or more of the differences determined not to represent drift using one or more criteria; and if one or more of the one or more criteria is satisfied, indicating the satisfaction thereof.

* * * * *